United States Patent [19]

Huang

[11] Patent Number: 5,236,582

[45] Date of Patent: Aug. 17, 1993

[54] FILTER DEVICE FOR AN AQUATIC TANK

[75] Inventor: Yu-Tsung Huang, Taipei Hsien, Taiwan

[73] Assignee: Sam Yu Pets Corporation, Taipei Hsien, Taiwan

[21] Appl. No.: 805,313

[22] Filed: Dec. 10, 1991

[51] Int. Cl.⁵ .............................................. B01D 25/02
[52] U.S. Cl. .................... 210/169; 210/221.2; 210/258; 210/282; 210/283; 210/416.2; 119/226; 119/259
[58] Field of Search ............ 210/169, 283, 220, 221.2, 210/282, 258, 416.2; 119/5, 2

[56] References Cited

U.S. PATENT DOCUMENTS

| | | |
|---|---|---|
| 2,782,161 | 2/1957 | Willinger et al. .................... 210/220 |
| 3,348,686 | 10/1967 | Spitzer ................................ 210/169 |
| 3,592,765 | 7/1971 | Rodriguez .......................... 210/169 |
| 3,630,367 | 12/1971 | Willinger ............................ 210/169 |
| 3,891,555 | 6/1975 | Bennett et al. ..................... 210/169 |
| 4,186,093 | 1/1980 | Willinger ............................ 210/169 |
| 4,295,965 | 10/1981 | Koster ................................ 210/169 |
| 4,601,821 | 7/1986 | Sherman et al. ................... 210/169 |
| 4,620,924 | 11/1986 | Goldman et al. .................. 210/169 |
| 4,753,723 | 6/1988 | Willinger ........................ 210/221.2 |
| 4,783,258 | 11/1988 | Willinger ............................ 210/169 |
| 4,944,871 | 7/1990 | Ogawa ................................ 210/169 |
| 5,006,238 | 4/1991 | Tominaga .......................... 210/169 |
| 5,131,821 | 7/1992 | Marioni et al. .................... 210/169 |

FOREIGN PATENT DOCUMENTS 2301430  7/1974  Fed. Rep. of Germany ...... 210/169

Primary Examiner—Stanley S. Silverman
Assistant Examiner—Cynthia L. Nessler
Attorney, Agent, or Firm—Irving M. Weiner; Joseph P. Carrier; Pamela S. Burt

[57] ABSTRACT

A filter device for an aquatic tank includes a filter unit having a first casing. The first casing has a top open end, a bottom closed end formed with openings, a surrounding side wall interconnecting the top open end and the bottom closed end and being formed with a water inlet opening, and a perforated first tubular member extending from one of the openings of the bottom closed end to the top open end. The filter unit has a first filter medium provided around the first tubular member. A bottom basin has a top open end. The bottom closed end of the first casing is stacked on and detachably interengages the top open end of the basin. A top pumping unit includes a second casing and a pump mounted in the second casing. A bottom end of the second casing is stacked on and detachably interengages the top open end of the first casing. The pump has an entrance port connected to the first tubular member and an exhaust port extending out of a surrounding side of the second casing.

6 Claims, 5 Drawing Sheets

FILTER DEVICE FOR AN AQUATIC TANK

BACKGROUND OF THE INVENTION

1. Field of the Invention

This invention relates to a filter device, more particularly to a filter device for an aquatic tank to purify water therein.

2. Description of the Related Art

An aquatic tank generally has a filter device to purify water therein. Referring to FIG. 1, a conventional filter device (A) has a one-piece casing (a1) formed with a water entrance port (a2) and a water exhaust port (a3). The filter device (A) has a pumping unit and a filter medium provided with activated carbon mounted in the casing (a1). Since the filter device (A) has a limited filtering effect, another filter device with a larger filtering capacity is necessary when a larger aquatic tank is used.

SUMMARY OF THE INVENTION

Therefore, the objective of this invention is to provide an improved filter device for an aquatic tank which includes a plurality of filter units that are detachably interengaged to one another. A user can use several filter units so as to obtain the desired filtering effect.

Accordingly, a filter device for an aquatic tank to purify water therein includes a filter unit having a first casing. The first casing has a top open end, a bottom closed end formed with a plurality of openings, a surrounding side wall interconnecting the top open end and the bottom closed end and being formed with a water inlet opening, and a perforated first tubular member extending from one of the openings of the bottom closed end to the top open end. The filter unit has a first filter medium provided around the first tubular member.

A bottom basin has a top open end. The bottom closed end of the first casing is stacked on and detachably interengages the top open end of the basin.

A top pumping unit includes a second casing and a pump mounted in the second casing. The second casing has a bottom end and a surrounding side connected to the bottom end thereof. The bottom end of the second casing is stacked on and detachably interengages the top open end of the first casing. The pump has an entrance port connected to the first tubular member and an exhaust port extending out of the surrounding side of the second casing.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
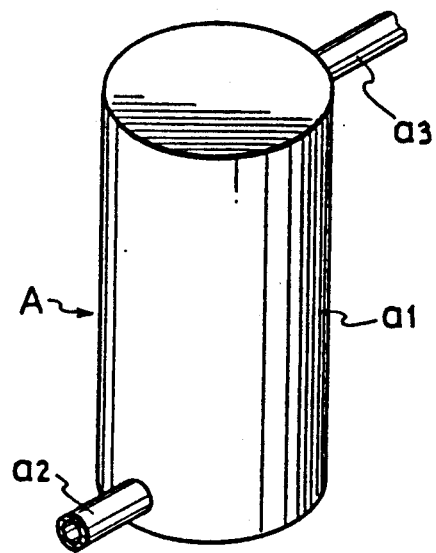
FIG. 1 is a schematic view of a conventional filter device for an aquatic tank.
Figure 2:
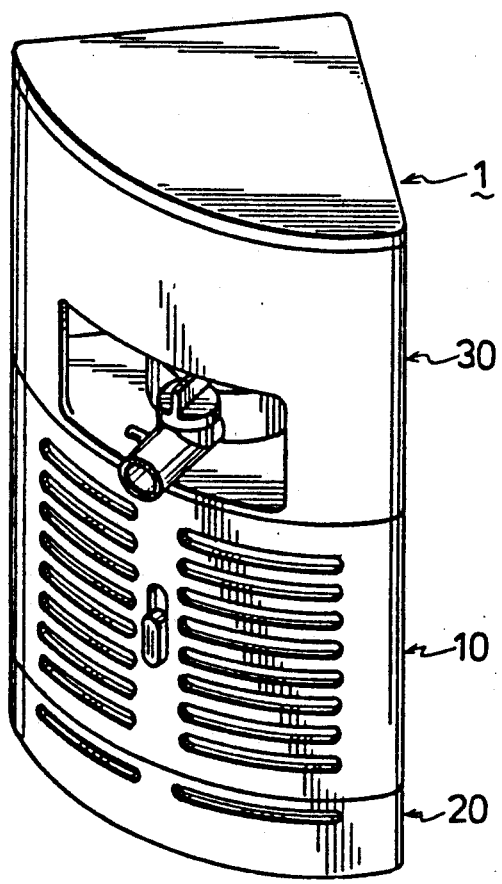
FIG. 2 is a perspective view of a filter device of this invention.
Figure 3:
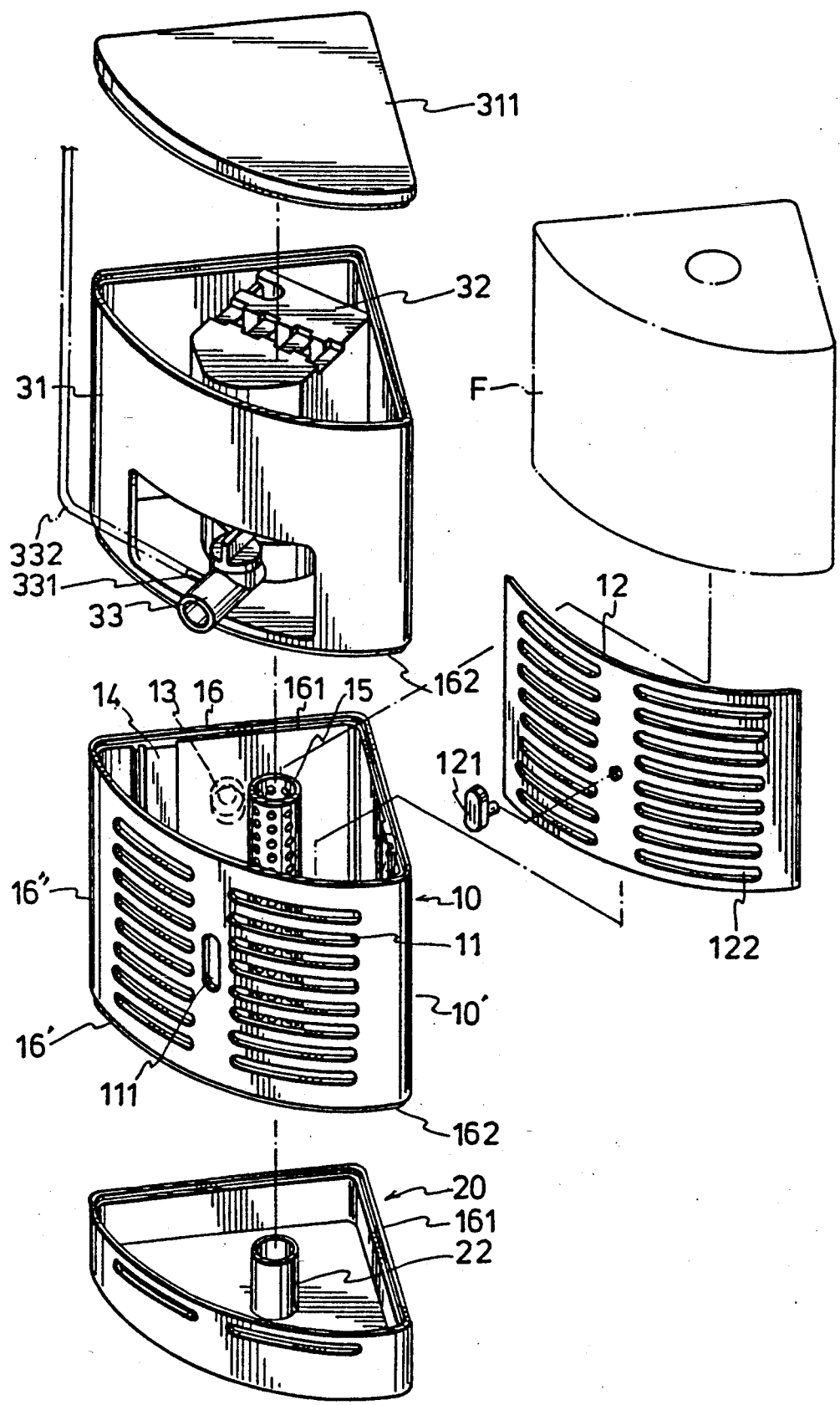
FIG. 3 is an exploded view of the filter device of this invention.
Figure 4:
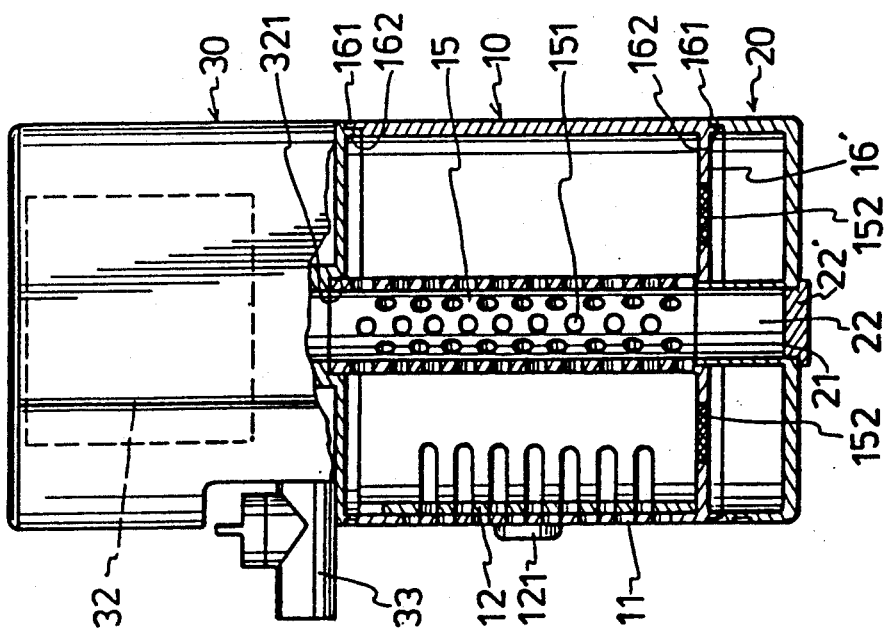
FIG. 4 is a partial sectional view of the filter device of this invention.

Referring to FIGS. 2 to 4, a filter device (1) of this invention for an aquatic tank (not shown) to purify water therein includes a filter unit (10), a bottom basin (20) and a top pumping unit (30). The filter unit (10) includes a sector-shaped first casing (10') having a top open end (16), a bottom closed end (16') formed with a plurality of openings (152) and a surrounding side wall (16") interconnecting the top open end (16) and the bottom closed end (16'). The surrounding side wall (16") has a curved portion formed with two sets of transverse elongated water inlet openings (11) and an axial sliding slot (111). The filter unit (10) includes a curved gate plate (12) provided therein and having a curvature which corresponds to that of the curved portion of the surrounding side wall (16"). The gate plate (12) has two sets of transverse elongated openings (122) which correspond to the water inlet openings (11). An adjusting button (121) passes through the sliding slot (111) and engages the gate plate (12). The adjusting button (121) is moved in the sliding slot (111) and rotated so as to adjust the position of the gate plate (12) and control the water flowing through the water inlet openings (11). The filter unit (10) has a perforated tubular member (15) extending from a central opening of the bottom closed end (16') to the top open end (16). The perforated tubular member (15) has a plurality of openings (151) formed thereon. The filter unit (10) has a first filter medium (F) which has activated carbon provided thereon and is disposed around the perforated tubular member (15). The first casing (10') has a radial outward projection (13) which is attached to the wall of the aquatic tank so as to position the filter unit (10) inside the aquatic tank. The top open end (16) has a first connecting portion (161) formed with an annular shoulder and an upwardly extending peripheral flange. The bottom closed end (16') has a second connecting portion (162) formed with an annular shoulder and a downwardly extending flange. The first connecting portion (161) and the second connecting portion (162) are complementary in form.

Note that like elements are indicated by the same reference numerals through out the disclosure.

The bottom basin (20) has a shape corresponding to that of the first casing (10'). The basin (20) has a top open end formed with a first connecting portion (161), a closed bottom end formed with an opening (21), a tubular member (22) extending upwardly from the opening (21), and a bottom cover (22') detachably covering the opening (21). The tubular member (22) is connected to the perforated tubular member (15) when the filter units (10) are stacked on the basin (20), and the second connecting portion (162) of the first casing (10') detachably interengages the first connecting portion (161) of the basin (20).

The top pumping unit (30) includes a sector-shaped second casing (31) and a pump (32) mounted in the second casing (31). The second casing (31) has a top cover (311), a bottom end formed with a second connecting portion (162), and a surrounding side interconnecting the cover (311) and the bottom end thereof. The second connecting portion (162) of the second casing

(31) detachably interengages the first connecting portion (161) of the first casing (10') when the pumping unit (30) is stacked on the filter unit (10). The pump (32) has an entrance port (321) connected to the perforated tubular member (15) and an exhaust port (33) extending out of the surrounding side of the second casing (31).

When the gate plate (12) is shifted according to the sliding slot (111) and when the elongated openings (122) are respectively aligned with the water inlet openings (11), the water inlet openings (11) are opened. The pump (32) is activated. The water in the aquatic tank is drawn into the filter device (1) via the water inlet openings (11), is filtered by the first filter medium (F), and is discharged back into the aquatic tank via the perforated tubular member (15), the entrance port (321) and the exhaust port (33). Excessive impurities of the water which cannot be retained on the filter medium (F) fall into, and are collected in, the basin (20).

Referring again to FIG. 3, the exhaust port (33) of the pump (32) may further have a branch connector (331) and an air pipe (332) connected to the branch connector (331) which has an end opened to atmosphere. Therefore, when the pump (32) is activated, air can be drawn into the aquatic tank via the air pipe (332) to increase the oxygen content in the aquatic tank.

Figure 5:
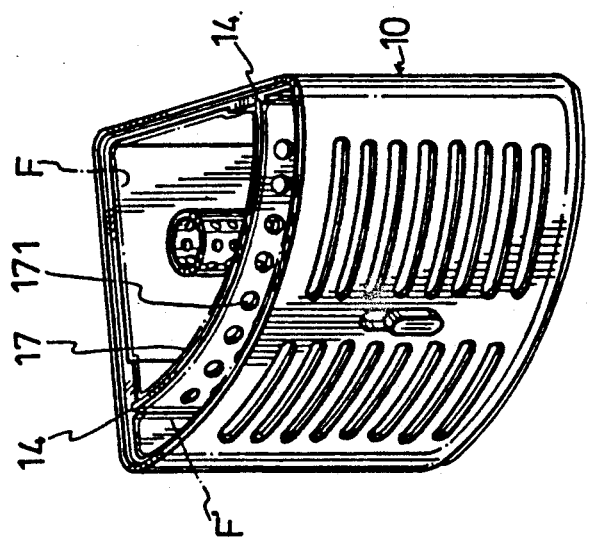
FIG. 5 is a perspective view of a filter unit having a partition plate.

Referring to FIG. 5, the filter unit (10) may further have a second filter medium (F') which is provided with activated carbon so as to furnish a filtering effect for water and a fungi cultivating member to provide feed for fish in the aquatic tank. The filter unit (10) further includes a pair of elongated retaining grooves (14) provided on the surrounding side wall (16") and a perforated partition plate (17) mounted in the retaining grooves (14) to define two spaces in the first casing (10') so as to respectively receive the first and second filter media (F, F').

Figure 6:
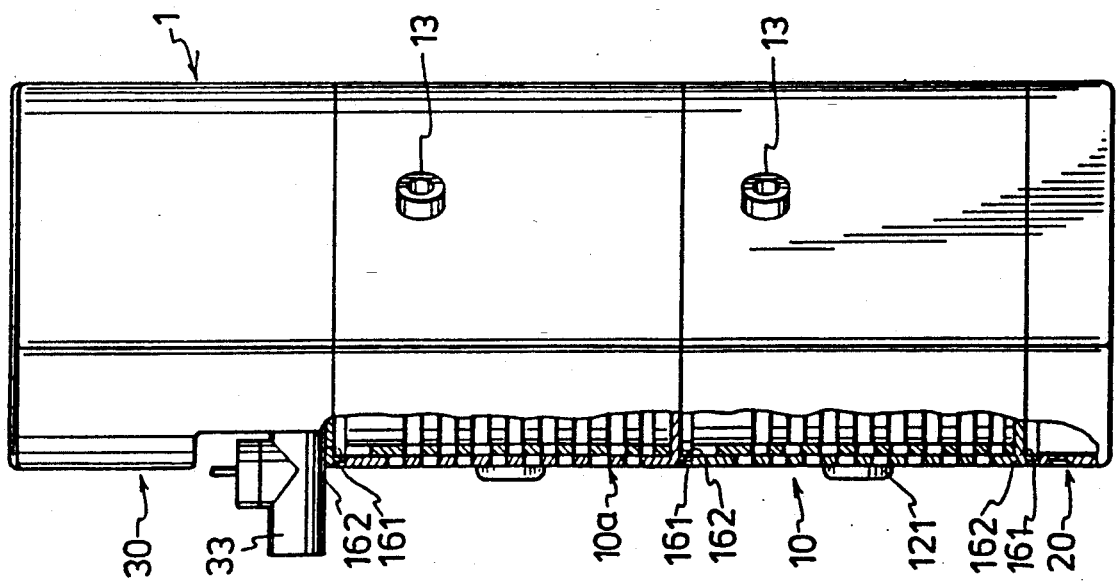
FIG. 6 is a schematic view of the filter device of this invention having two filter units.

Referring to FIG. 6, the filter device (1) of this invention further has a filter unit (10a) which is stacked between and detachably interengages the pumping unit (30) and the filter unit (10). The perforated tubular members (15) of the filter units (10, 10a) are interconnected. Additional filter units (10) can be provided between the pumping unit (30) and the basin (20) in order to increase the filtering effect. All of the filter units (10) can be stacked on and interengage one another. The power output of the pump (32) can be adjusted according to the numbers of the filter units (10) so as to obtain an optimum filtering effect.

Figure 7:
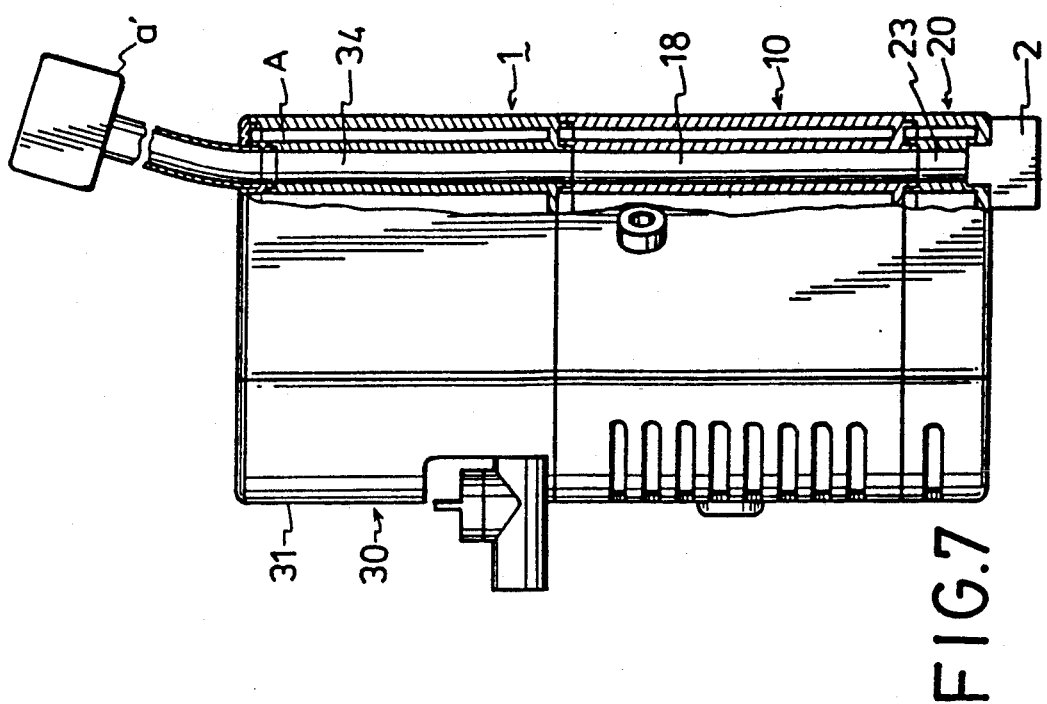
FIG. 7 is a schematic view of the filter device of this invention having an air supply unit.

Referring to FIG. 7, the filter device (1) of this invention further includes an air supply unit (A) to increase the oxygen content of the water. The air supply unit (A) includes an air pump (a'); an air tube connected to the air pump (a') which has a first tube section (34) mounted in the second casing (31), a second tube section (18) mounted in the first casing (10') and detachably connected to the first tube section (34), and a third tube section (23) mounted in the basin (20) and detachably connected to the second tube section (18); and a bubble creating member (2) in the form of a foamed cellular rigid body. The bubble creating member (2) is detachably connected to the third tube section (23).

Figure 8:
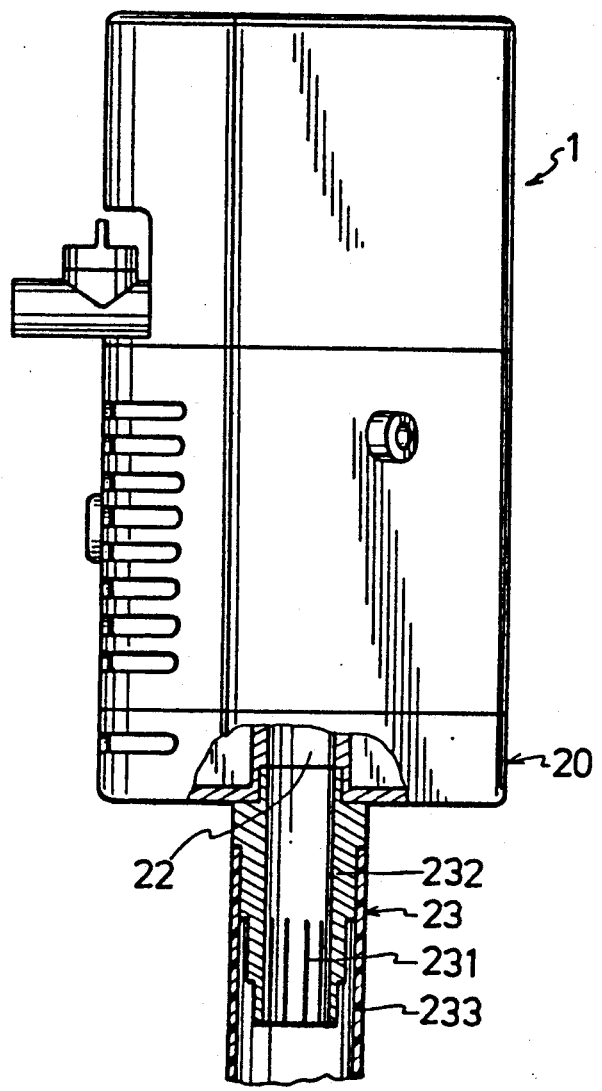
FIG. 8 is a schematic view of the filter device of this invention having a tube unit.

Referring to FIG. 8, the filter device (1) further includes a tube unit (23) detachably connected to the tubular member (22) to extend downwardly into the bottom of the aquatic tank in order to draw water thereat. The tube unit (23) has a first tube (232) formed with elongated openings (231) and a second tube (233) detachably sleeved on the first tube (232). Water is drawn into and discharged out of the filter device (1) via the tube unit (23), the tubular member (22), the perforated tubular member (15), the entrance port (321) and the exhaust port (33). This permits good water circulation inside the aquatic tank.

Therefore, the filter device (1) of this invention can be adapted for use in aquatic tanks of different sizes. A user can use several filter units (10) so as to obtain the desired filtering effect. In addition, the filter units (10) and the basin (20) are easily detached from one another for cleaning.

While the present invention has been described in connection with what is considered the most practical and preferred embodiment, it is understood that this invention is not limited to the disclosed embodiments, but is intended to cover various arrangements included within the spirit and scope of the broadest interpretations and equivalent arrangements.

I claim:

1. A filter device for an aquatic tank to purify water therein comprising:

a filter unit including a first casing, said first casing having a top open end, a bottom closed end formed with a plurality of openings, a surrounding side wall interconnecting said top open end and said bottom closed end and being formed with a water inlet opening, and a perforated first tubular member extending from one of said openings of said bottom closed end to said top open end, said filter unit having a first filter medium provided around said first tubular member;

a bottom basin having a top open end, said bottom closed end of said first casing being stacked on and detachably interengaging said top open end of said basin, said basin having a bottom closed end formed with an opening, and a second tubular member extending upwardly from said opening of said bottom closed end thereof to be connected to said first tubular member when said first casing interenengages said basin;

a tube unit detachably connected to said second tubular member for extending downwardly into the bottom of said aquatic tank in order to draw water thereat;

a top pumping unit including a second casing and a pump mounted in said second casing, said second casing having a bottom end and a surrounding side connected to said bottom end thereof, said bottom end of said second casing being stacked on and detachably interengaging said top open end of said first casing, said pump having an entrance port connected to said first tubular member and an exhaust port extending out of said surrounding side of said second casing.

2. A filter device as claimed in claim 1, having two filter units including a first and a second filter unit, said pumping unit being stacked on said first filter unit, said first filter unit being stacked on said second filter unit, said second filter unit being stacked on said basin, said pumping unit, said first and second filter units and said basin detachably interengaging one another.

3. A filter device as claimed in claim 1, wherein said filter unit further has a second filter medium, said first casing further including a perforated partition plate mounted therein to define two spaces in said first casing so as to receive said first and second filter media, respectively.

4. A filter device for an aquatic tank as claimed in claim 1, wherein said exhaust port has a branch air pipe having an end opened to atmosphere.

5. A filter device for an aquatic tank as claimed in claim 1, wherein said first filter medium includes activated carbon.

6. A filter device for an aquatic tank to purify water therein comprising:

a filter unit including a first casing, said first casing having a top open end, a bottom closed end formed with a plurality of openings, a surrounding side wall interconnecting said top open end and said bottom closed end and being formed with a water inlet opening, and a perforated first tubular member extending from one of said openings of said bottom closed end to said top open end, said filter unit having a first medium provided around said first tubular member;

a bottom basin having a top open end, said bottom closed end of said first casing being stacked on and detachably interengaging said top open end of said basin;

a top pumping unit including a second casing and a pump mounted in said second casing, said second casing having a bottom end and a surrounding side connected to said bottom end thereof, said bottom end of said second casing being stacked on and detachably interengaging said top open end of said first casing, said pump having an entrance port connected to said first tubular member and an exhaust port extending out of said surrounding side of said second casing; and an air supply unit to increase the content of oxygen in the water, said air supply inlet including an air pump and having a first tube section mounted in said second casing, a second tube section mounted in said first casing and detachably connected to said first tube section, a third tube section mounted in said basin and detachably connected to said second tube section, and a bubble creating member in the form of a foamed cellular rigid body, said bubble creating member being detachably connected to said third tube section.

* * * * *

UNITED STATES PATENT AND TRADEMARK OFFICE
CERTIFICATE OF CORRECTION

PATENT NO. : 5,236,582
DATED : August 17, 1993
INVENTOR(S) : Yu-Tsung Hunag

It is certified that error appears in the above-indentified patent and that said Letters Patent is hereby corrected as shown below:

Column 5, line 17 after "first" insert --filter--.

Column 6, line 12, change "inlet" to --unit--.

Signed and Sealed this

Twelfth Day of April, 1994

Attest:

BRUCE LEHMAN

Attesting Officer     Commissioner of Patents and Trademarks